United States Patent [19]

Foster et al.

[11] 4,003,436

[45] Jan. 18, 1977

[54] OSCILLATORY CULTIVATOR

[75] Inventors: Philip C. Foster; Bert E. Forsman, both of Seattle, Wash.

[73] Assignee: The Black and Decker Manufacturing Company, Towson, Md.

[22] Filed: Aug. 15, 1973

[21] Appl. No.: 388,498

[52] U.S. Cl. .................................. 172/41; 172/42; 172/59; 172/110

[51] Int. Cl.² .......................................... A01B 33/06

[58] Field of Search ............................ 172/41–43, 172/59, 110

[56] References Cited
UNITED STATES PATENTS

| | | | |
|---|---|---|---|
| 1,578,769 | 3/1926 | Sergeant | 172/110 X |
| 2,625,867 | 1/1953 | Hands | 172/41 |
| 2,888,084 | 5/1959 | Trecker | 172/41 |
| 3,146,832 | 9/1964 | Fry | 172/110 X |
| 3,774,687 | 11/1973 | Van Der Lely | 172/59 X |

Primary Examiner—Clifford D. Crowder
Attorney, Agent, or Firm—Joseph R. Slotnik; Edward D. Murphy; Leonard Bloom

[57] ABSTRACT

A portable, power operated, hand cultivator comprising a frame having a motor supported thereon which, through a transmission, oscillates two or more generally vertically disposed cultivator tines extending downwardly from the frame. A handle is provided for easy control and manipulation of the device.

1 Claim, 8 Drawing Figures

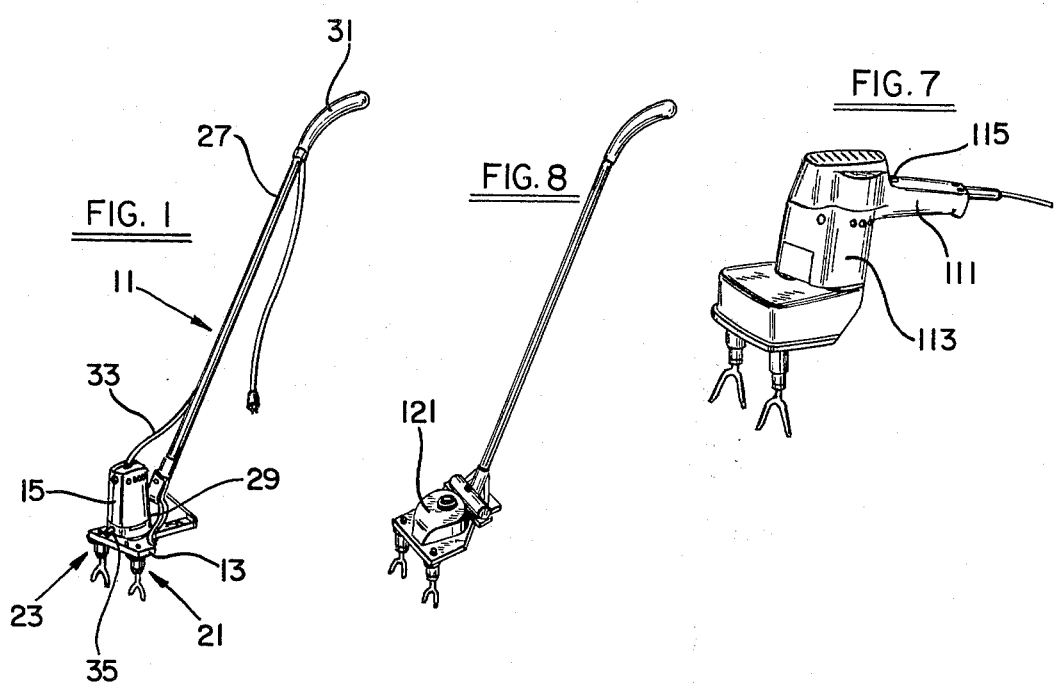
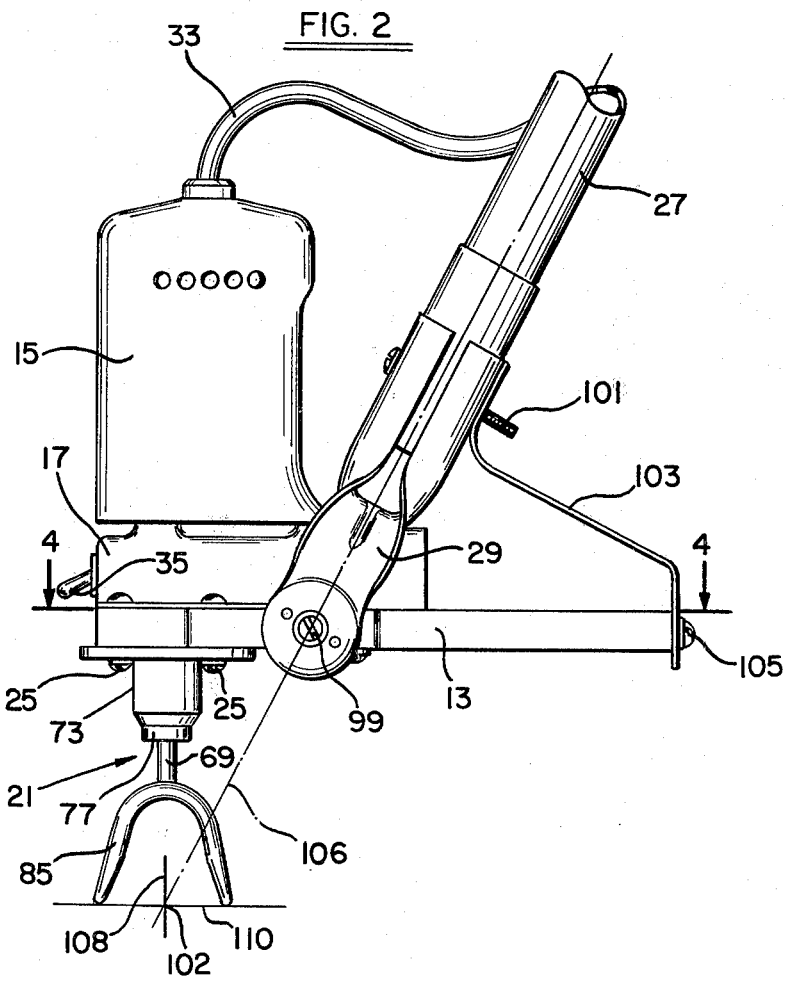

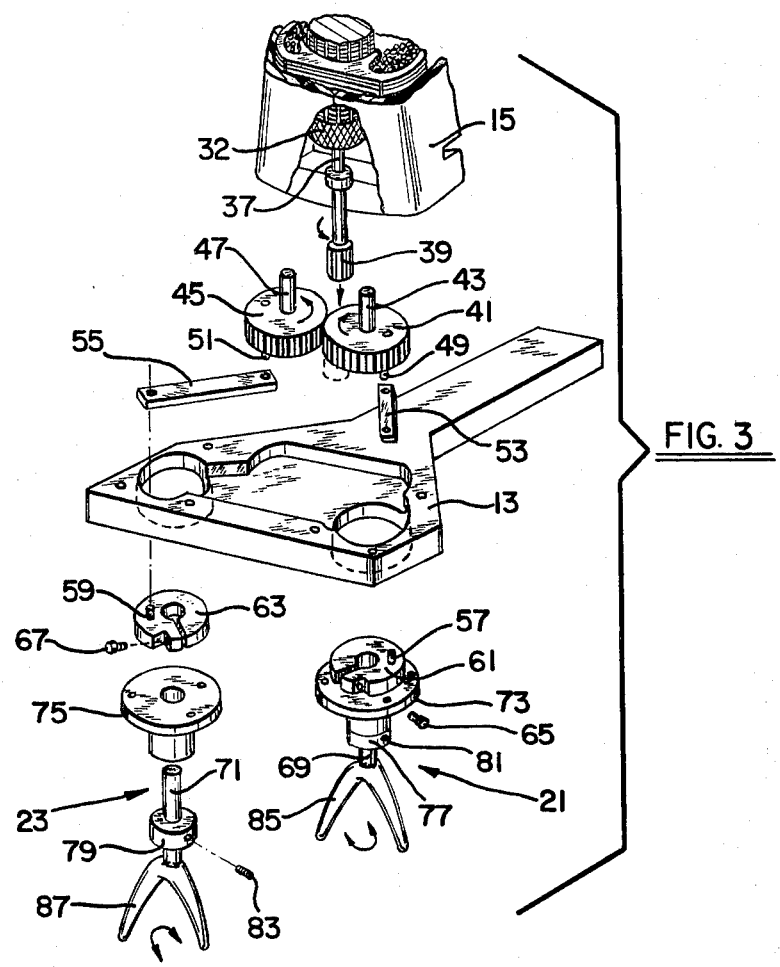
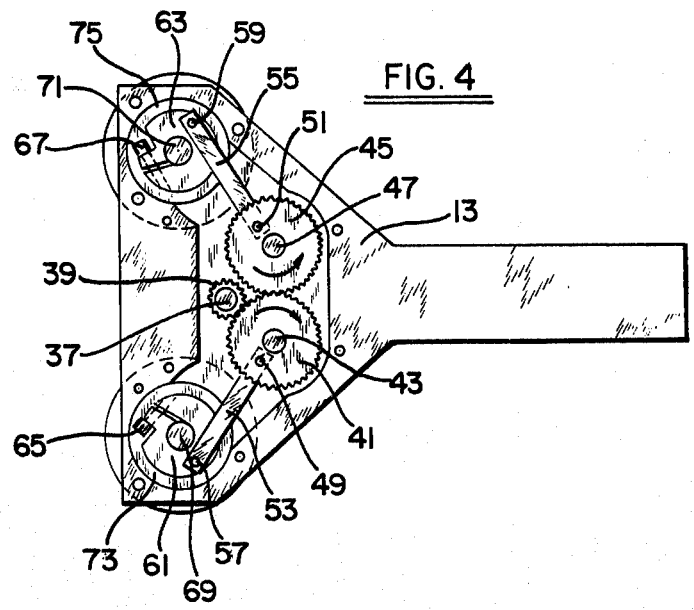

4,003,436

OSCILLATORY CULTIVATOR

SUMMARY OF THE INVENTION

The present invention is directed to a hand-held portable, power operated cultivator embodying two or more, motor driven tines adapted to oscillate about a generally vertical axis with respect to the ground to loosen growth but not turn it under as do devices which rotate about a horizontal axis. The cultivator can have an upstanding handle, for stand-up operation, or it can have a relatively short handle for close operation and control. Desirably, the handle is positioned with respect to the tines for maximum leverage in soil working. In addition, the inventive cultivator can be driven by an electric motor, gasoline engine, or other suitable prime mover. Furthermore, in a preferred embodiment, a pair of counter oscillating, spaced tines are provided which oscillate through a relatively small angle, for example, 90°. This insures that roots and growth will not wrap around the tines, and that damage to the device or impact shock to the user will not occur when the tines encounter a hard object, such as an embedded rock. This arrangement also provides an efficient, relatively low cost, safe, and balanced unit fulfilling all of the inventive objects herein set forth.

The main objects of the present invention, therefore, are to provide an improved, hand-held, portable, power operated cultivator which is light in weight and well balanced and therefore easy to control and manipulate, which vigorously agitates and breaks up the soil and renders it efficient and able to quickly cultivate relatively large and difficult soil areas, and which is relatively safe and comfortable even for the inexperienced user.

Further important objects of the present invention are to provide an improved cultivator of the above character which is adapted for use with an elongated, upstanding handle in "stand-up" hand fashion, and for use with a relatively short handle in closely hand held fashion, and wherein at least in the former version, the handle and driven cultivator tines are constructed and arranged for maximum leverage in use.

Further important objects of the present invention are to provide a cultivator of the above character susceptible for being powered by various prime movers such as, for example, an electric motor or a gasoline engine.

Additional important objects of the present invention are to provide an improved cultivator of the above character which is relatively inexpensive to manufacture, rugged in construction, and safe, reliable and efficient in use.

Other objects and advantages will become more apparent from a consideration of the detailed description to follow, taken in conjunction with the drawings annexed hereto.

BRIEF DESCRIPTION OF THE DRAWINGS

FIG. 1 is a perspective view showing a preferred form of cultivator embodying the present invention, this being a stand-up version powered by an electric motor;

FIG. 2 is an enlarged, side elevational view of the cultivator of FIG. 1, with a portion of the handle removed;

FIG. 3 is an exploded, perspective view showing the internal parts of the power train of the cultivator of FIGS. 1 and 2;

FIG. 4 is a sectional view of the structure of FIG. 3, taken along the line 5—5 thereof;

FIG. 7 is a perspective view showing a modified form of cultivator, being a closely hand-held version; and FIG. 8 is a perspective view showing still a further modified form of the invention, being a stand-up, gasoline engine powered unit.

DETAILED DESCRIPTION

Figure 5:
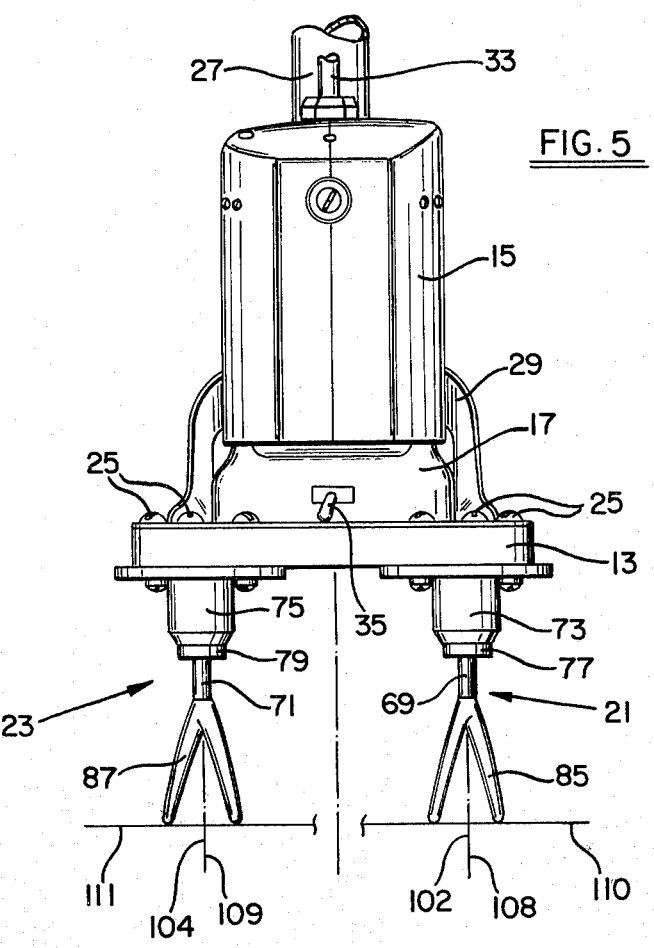
FIG. 5 is an enlarged, front elevational view of the cultivator of FIG. 1.

Referring now more specifically to the drawings, a preferred form of cultivator embodying the present invention is illustrated generally at 11 in FIG. 1 and is seen to include a frame 13 having a motor housing 15 and gear case 17 supported thereon and suitably fixed thereto. See also FIGS. 2–5. A pair of cultivating tine assemblies 21, 23 are suspended beneath the frame 13 and are secured thereto by bolts 25. An upstanding handle 27 is secured by a bracket 29 to the frame 13 and terminates in a hand grip 31 for control and manipulation of the device. The illustrated version of this device shown in FIGS. 1 and 3 is powered by an electric motor 32, and, to this end, a line cord 33 extends from the motor housing 15 and is connectable to a suitable power source, preferably through an extension cord (not shown). The electric motor is controlled by a switch operable through a toggle lever 35 which may be located on the gear case 17 as shown, or may be conveniently positioned on the hand grip 31.

Considering now FIGS. 4 and 5, the electric motor 32 is seen to have an output rotary shaft 37 formed or provided with a pinion 39 at the lower end thereof. The pinion 39 drivingly engages a relatively large spur gear 41 supported on a stub shaft 43, while the gear 41 drivingly engages a substantially identical gear 45 supported on a similar stub shaft 47. The gears 41, 45 are provided with similarly but oppositely disposed crank pins 49, 51 connected to one end of connecting rods 53, 55, respectively. The other ends of connecting rods 53, 55 are pivotally connected to crank pins 57, 59 carried by collars 61, 63, respectively. As shown, the collars 61, 63 are clampingly engaged, such as by set screws 65, 67, to tine shafts 69, 71 rotatably supported by bearing assemblies 73, 75. The tine shafts 69, 71 are retained against axial movement within the bearing assemblies by the collars 61, 63 and by collars 77, 79, and set screws 81, 83, respectively. Each of the tine shafts 21, 23 includes a substantially flared, U-shaped lower extremity 85, 87 defining cultivator tines and suitably secured thereto as by welding.

The radial throws of crank pins 49, 51 are desirably substantially identical to one another and somewhat less than the radial throw of the crank pins 57, 59, also which are desirably identical to one another. Also, crank pins 49, 51 are opposite one another, as shown, as are crank pins 57, 59. Thus, as the meshing gears 41, 45 rotate opposite one another, the collars 61, 63 and the associated tine shafts 21, 23 oscillate opposite to one another through arcs substantially equal to 90°, substantially as shown schematically in FIG. 6. This arc, together with the opposite directional movement of tine extremities 85, 87, develops sufficient agitation at the soil level so as to efficiently aerate and cultivate the soil processed thereby. Also, the operation of the power trains to each of the tine shafts 21, 23 is substantially opposite to one another thereby rendering the assembly well-balanced with minimal vibrational forces, and thereby easy to handle and use.

Figure 6:
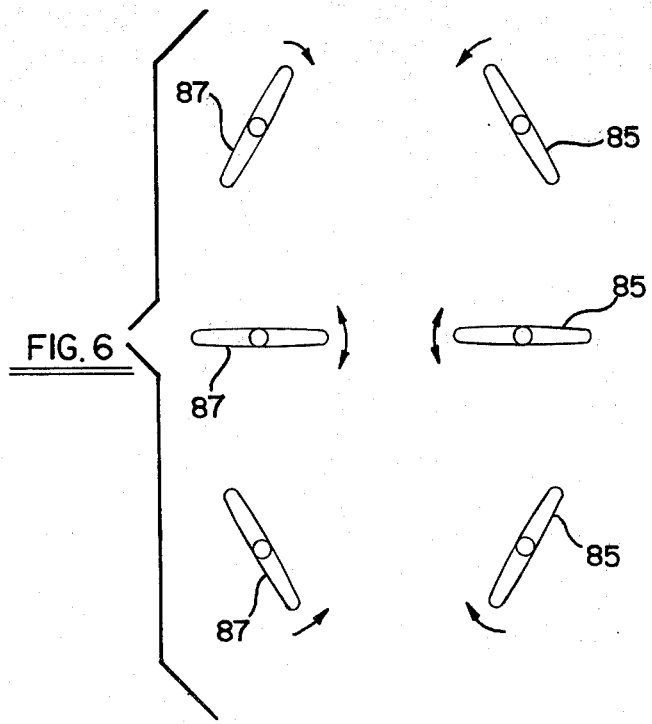
FIG. 6 is a schematic plan view showing sequential positions for the cultivator tines in this invention.

An inherent feature of this construction is that should one or both tines 85, 87 encounter a hard object such as an embedded rock as they progress through the soil, the user will immediately be aware of this situation without impact shock to him or possible damage to the device. Thus, should such encounter occur as the device moves from right to left or vice versa, as seen in FIG. 2, the translation path of the tines 85, 87 is vertical, as seen in FIG. 6 so that at encounter, the tines 85, 87 are at the end of their oscillatory stroke. Thus, the tines 85, 87 are at or near zero velocity, maximum acceleration and the encounter develops a light "tapping" only which warns the user but which cannot jar the user or damage the device.

In the case of lateral travel of the device, that is, from right to left or vice versa, as seen in FIG. 5, the tines 85, 87 will brush against the hard object, again developing a light tapping but no potential danger to the user or damage to the device.

Further, it will be appreciated that since the tine extremities 85, 87 oscillate through a relatively small angle, that is, 90°, and since these tine extremities 85, 87 are spaced from one another as shown, the likelihood of serious injury to ones hand or foot accidentally inserted into the path of the tine extremities is minimized.

Additional important features of this construction reside in the fact that the oscillatory motion of the tines prevent roots and other growth from tangling and/or wrapping around the tines which would reduce the efficiency of the device and render it difficult to manipulate. Furthermore, heavy root growth, such as in large plants or trees, will act like hard objects described above so that damage to this growth is prevented.

The handle 27 is shown extending upwardly from the frame 13 at substantially a 45° angle. The bracket 29 secures the handle 27 to the frame by means of fasteners 99, 101, the latter also serving to secure one end of a reinforcing bracket 103, the other end of which is secured to the frame 13 by a fastener 105. As shown in FIGS. 2 and 5, an imaginery extension 106 of the axis of handle 27 intersects a line connecting points 102, 104 defined by the vertical axes 108, 109 of tine shafts 69, 71 and horizontal lines 110, 111 connecting the lower extremities of the tines. Thus, force exerted by the operator through the handle 27 is applied at the working plane of the tine extremities 85, 87 thereby achieving maximum leverage in moving the tines through the soil being cultivated. This construction, therefore, enables the operator to optimize the forces developed in use of the cultivator so that maximum efficiency is achieved with minimum exertion. This allows the cultivator to be used even by a woman in wand-like fashion, and minimizes fatigue.

Considering now the modifications shown in FIGS. 7 and 8, the construction there will be understood to be substantially the same as that described above for FIGS. 1-5 inclusive, with the exception that the version of FIG. 7 is a closely hand-held version rather than the stand-up type described above. Thus, a rearwardly extending handle 111 is connected to the motor housing 113 to enable the user to operate the device in close quarters. If desired, suitable electrical switch operating means 115 is provided on the handle 111 for on/off control of the device. Like the embodiment of FIGS. 1-5, the handle 111 can be inclined rearwardly and be oriented for optimum leverage. The power train of this version of the invention will be understood to be substantially the same as that described above for FIGS. 1-5.

FIG. 8 shows a stand-up version cultivator embodying the form of the invention described for FIGS. 1-5 above with the exception that a small gasoline engine 121 is substituted for the electric motor, and wiring, switches, etc. attendant with the electric motor version of FIGS. 1-5 are eliminated.

While preferred embodiments of the present invention have been illustrated and described in detail above, it will be understood that various additions, substitutions, modifications, and omissions may be made thereto without departing from the spirit of the invention.

We claim:

1. A portable, power operated cultivator comprising a frame, a motor mounted on said frame substantially centrally of its width, said motor having a vertically disposed, rotatable output shaft, a pair of cultivator tines suspended from said frame for oscillation about generally vertical axes, one on either side of said motor, gear train means interconnecting said motor output shaft and said oscillating tines, said gear train means including a pair of oppositely rotating gear elements, each of said gear elements including a drive means eccentrically disposed relative to the axis of said gear element, a pair of means each including a connecting rod engaged with one of said eccentric drive means and also connected to a respective one of said cultivator tines, said connecting rods being substantially symmetrical with respect to a midplane of said frame and operating substantially in opposite directions to one another, whereby the forces developed by said cultivator are substantially equal and opposite to one another thereby cancelling each other and minimizing vibrational forces arising therein.

* * * * *